US008972354B1

(12) United States Patent
Telang

(10) Patent No.: US 8,972,354 B1
(45) Date of Patent: Mar. 3, 2015

(54) SYSTEMS AND METHODS FOR PRESERVING INDIVIDUAL BACKED-UP FILES IN ACCORDANCE WITH LEGAL-HOLD POLICIES

(75) Inventor: Nilesh Telang, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 351 days.

(21) Appl. No.: 13/233,409

(22) Filed: Sep. 15, 2011

(51) Int. Cl.
*G06F 7/00* (2006.01)

(52) U.S. Cl.
USPC ............ 707/654; 707/653; 707/661; 715/735

(58) Field of Classification Search
USPC .................................. 707/609–705; 715/735
See application file for complete search history.

(56) References Cited

U.S. PATENT DOCUMENTS

| 2009/0119354 | A1* | 5/2009 | Stuart et al. | 707/206 |
| 2009/0150168 | A1* | 6/2009 | Schmidt | 705/1 |
| 2011/0047132 | A1* | 2/2011 | Kilday et al. | 707/694 |
| 2011/0093471 | A1* | 4/2011 | Brockway et al. | 707/747 |
| 2012/0210398 | A1* | 8/2012 | Triantafillos et al. | 726/4 |

OTHER PUBLICATIONS

Wright, Benjamin; Electronic Data Records Law—How to Win E-Discovery; http://legal-beagle.typepad.com/; Mar. 24, 2011.
EMC2 Sourceone Ediscovery—Kazeon; End-to-End Legal Hold Manager; http://www.kazeon.com/products2/legalhold_manager.php; Taken from Site on Mar. 31, 2011.
Daragh O Brien; Personal Data—an Asset we hold on Trust; http://obriend.info/2010/01/13/personal-data-an-asset-we-hold-on-trust/; Jan. 13, 2010.
Iron Mountain Company; Litigation Holds; http://www.mimosasystems.com/html/ediscovery_litigation.htm; Taken from Site on Mar. 31, 2011.
Kahn Consulting, Inc.; "Hold Everything" Legal Hold & Backup Tape Remediation; http://www.kahnconsultinginc.com/rim-services-hold-everything-legal-hold-backup-tape-remediation.php; Taken from Site on Mar. 31, 2011.
Jim McGann; Save Time and Money with Automated Process to Extract Relevant ESI from Tape; http://content.arma.org/IMM/may-june2010/IMM0510techtrendssavetimeandmoney.aspx; Jun. 2010.
Storediq; Intelligent Legal Hold simplifies and expedites a forensically-sound legal hold process; http://www.storediq.com/technology/legal_hold; Taken from Site on Mar. 31, 2011.

* cited by examiner

*Primary Examiner* — Tony Mahmoudi
*Assistant Examiner* — Tuan-Khanh Phan
(74) *Attorney, Agent, or Firm* — ALG Intellectual Property, LLC

(57) ABSTRACT

A computer-implemented method for preserving individual backed-up files in accordance with legal-hold policies may include (1) providing at least one legal-hold policy that specifies the manner in which individual backed-up files that potentially relate to legal proceedings are to be preserved, (2) identifying at least one file that has been backed up, (3) identifying at least one legal purpose for preventing deletion of the backed-up file, (4) applying, in response to the identification of the legal purpose, the legal-hold policy to the backed-up file, and then (5) preserving the backed-up file in accordance with the legal-hold policy identified in the file metadata associated with the backed-up file. Various other systems, methods, and computer-readable media are also disclosed.

20 Claims, 6 Drawing Sheets

File Metadata Associated with Backed-up File
400

---
**************************************************
File Name: EXAMPLE.DOC
Last Backup Date: 03/01/2011
Applicable Policies: (1) SIX-MONTH RETENTION POLICY
                  (2) LEGAL-HOLD POLICY
Applicable Policy Type: LONG-TERM LEGAL HOLD
**************************************************
---

Legal-hold Policy
122

---
**************************************************
Policy Description: PLACE A LEGAL HOLD ON BACKED-UP FILES THAT POTENTIALLY
    RELATE TO LEGAL PROCEEDINGS UNTIL THE LEGAL PURPOSE
    CORRESPONDING TO THE LEGAL HOLD HAS BEEN FULFILLED
Legal Purposes: (1) PRESERVATION OF INFORMATION RELATED TO CURRENT LEGAL
         PROCEEDING
         (2) COMPLIANCE WITH LEGAL RULES OR GUIDELINES
Policy Types: (1) SHORT-TERM LEGAL HOLD FOR PRESERVATION OF
        INFORMATION RELATED TO CURRENT LEGAL PROCEEDING
        (2) LONG-TERM LEGAL HOLD FOR COMPLIANCE WITH LEGAL RULES OR
        GUIDELINES
Type of Storage Corresponding to Short-term Legal Hold: SHORT-TERM STORAGE DEVICE
Type of Storage Corresponding to Long-term Legal Hold: LONG-TERM STORAGE DEVICE

SYSTEMS AND METHODS FOR PRESERVING INDIVIDUAL BACKED-UP FILES IN ACCORDANCE WITH LEGAL-HOLD POLICIES

BACKGROUND

In many countries, a party involved in a legal proceeding may obtain evidence from an opposing party through various "discovery" devices, such as requests for answers to interrogatories, requests for production of documents, and the like. In recent years, the rise of the information age has lead to the increased role of electronic discovery (or "e-discovery") in legal proceedings, which involves the discovery of information in electronic format.

One of the primary phases of e-discovery involves identifying (either manually or in an automated fashion using software) files that relate to a current or anticipated legal proceeding or that need to be retained in order to comply with various regulations or legal rules. Once identified, such files may be placed on "hold" (also known as a "legal hold") in an effort to preserve the potentially relevant information they contain. For example, a legal hold may prevent the deletion of potentially relevant files until a current or anticipated legal proceeding has been fully resolved or until all applicable regulations and/or legal rules have been satisfied.

Unfortunately, existing technologies used to identify and place legal holds on files may suffer from one or more shortcomings and/or inefficiencies that may result in the retention of data in an inefficient, wasteful manner. For example, many existing legal-hold technologies apply a legal hold to an entire backup image of a device, even if only a small portion of the files contained in such an image are relevant to the current or anticipated legal proceeding and/or regulation. In addition, existing legal-hold technologies may place a legal hold on multiple versions and/or copies of the same file, potentially resulting in the retention of redundant information. Existing legal-hold technologies may also store files that have been placed on legal hold on relatively expensive storage (such as disk storage), regardless of the purpose for the legal hold. As such, the instant disclosure identifies a need for systems and methods for efficiently and effectively preserving files that have been placed on legal hold.

SUMMARY

As will be described in greater detail below, the instant disclosure generally relates to systems and methods for preserving individual files in accordance with legal-hold policies in an efficient and effective manner. In one example, a computer-implemented method for accomplishing such a task may include (1) providing at least one legal-hold policy that specifies the manner in which individual backed-up files that potentially relate to legal proceedings are to be preserved, (2) identifying at least one file that has been backed up, (3) identifying at least one legal purpose for preventing deletion of the backed-up file, (4) applying, in response to the identification of the legal purpose, the legal-hold policy to the backed-up file by (a) identifying (or creating) file metadata associated with the backed-up file and (b) updating the file metadata associated with the backed-up file to indicate that the legal-hold policy has been applied to the backed-up file, and then (5) preserving the backed-up file in accordance with the legal-hold policy identified in the file metadata associated with the backed-up file.

In one example, the legal purpose for preventing deletion of the particular backed-up file may be to preserve information contained in the backed-up file that potentially relates to a current legal proceeding. In another example, the legal purpose for preventing deletion of the particular backed-up file may be to comply with one or more legal rules (such as the Federal Rules of Civil Procedure), regulations, or guidelines that require proactively preserving the particular backed-up file in the event that information contained in the backed-up file becomes relevant to a future legal proceeding. In some examples, the above-described method may involve applying the same legal-hold policy to multiple backed-up files for different legal purposes.

In one or more examples, the legal-hold policy may cause a backup application to preserve (or store) only a single instance of the particular backed-up file. The legal-hold policy may also prevent such a backup application from deleting the particular backed-up file until the legal purpose has been fulfilled. For example, after the legal-hold policy has been applied to a particular backed-up file, the backup application may be unable to delete the backed-up file until the legal proceeding has been fully resolved. As such, the legal-hold policy may be applied to the particular backed-up file for an indefinite (or infinite) period of time.

In various examples, the legal-hold policy may specify the most suitable type of storage for storing the particular backed-up file. In one example, the legal-hold policy may indicate that the backup application is to store the backed-up file in a particular type of storage based on the identified legal purpose. For example, if the identified legal purpose is to preserve information that potentially relates to a current legal proceeding, the legal-hold policy may indicate that the backup application is to store the particular backed-up file in a short-term storage device (such as a disk storage device) in order to facilitate relatively quick access to the information that relates to the current legal proceeding. In another example, if the identified legal purpose is to comply with one or more legal rules or guidelines, the legal-hold policy may indicate that the backup application is to store the particular backed-up file in a long-term storage device (such as a tape storage device) in order to conserve the relatively expensive storage space on the short-term storage device.

In some examples, the particular backed-up file that has been placed on legal hold may be contained in a backup image. In one example, the backup application may determine that the backup image that contains the particular backed-up file has expired. In response to this determination, the backup application may transfer the particular backed-up file contained in the backup image to a different storage device that corresponds to the type of storage specified in the legal-hold policy. Upon transferring the particular backed-up file to the different storage device, the backup application may delete the backup image.

In some examples, one or more additional policies may have been applied to the same backed-up file that has been placed on legal hold. Such additional policies may (like the legal-hold policy) prevent the backup application from deleting the particular backed-up file. In one example, the backup application may determine that (1) these additional policies no longer apply to the particular backed-up file and (2) that the legal-hold policy in question is the only policy currently preventing deletion of the particular backed-up file. In response to the determination that the legal-hold policy is the only policy currently preventing deletion of the particular backed-up file, the backup application may transfer the particular backed-up file to a different storage device that corresponds to the type of storage specified in the legal-hold policy.

In one embodiment, a system for implementing the above-described method may include a policy-provisioning module programmed to provide at least one legal-hold policy that specifies the manner in which individual backed-up files that potentially relate to legal proceedings are to be preserved. The system may also include a policy-enforcement module programmed to (1) identify at least one file that has been backed up, (2) identify at least one legal purpose for preventing deletion of the backed-up file, (3) apply, in response to the identification of the legal purpose, the legal-hold policy to the backed-up file by (a) identifying (or creating) file metadata associated with the backed-up file and (b) updating the file metadata associated with the backed-up file to indicate that the legal-hold policy has been applied to the backed-up file, and then (4) preserve the backed-up file in accordance with the legal-hold policy identified in the file metadata associated with the backed-up file.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) provide at least one legal-hold policy that specifies the manner in which individual backed-up files that potentially relate to legal proceedings are to be preserved, (2) identify at least one file that has been backed up, (3) identify at least one legal purpose for preventing deletion of the backed-up file, (4) apply, in response to the identification of the legal purpose, the legal-hold policy to the backed-up file by (a) identifying (or creating) file metadata associated with the backed-up file and (b) updating the file metadata associated with the backed-up file to indicate that the legal-hold policy has been applied to the backed-up file, and then (5) preserve the backed-up file in accordance with the legal-hold policy identified in the file metadata associated with the backed-up file.

As will be explained in greater detail below, by applying a legal-hold policy directly to individual backed-up files (as opposed to an entire backup image containing a variety of files that may not fall within the legal-hold policy), the various systems and methods described herein may avoid placing backed-up files that are unrelated to legal proceedings on legal hold, thereby reducing storage costs associated with preserving such files. In addition, by specifying the most suitable type of storage for storing a particular backed-up file and/or by only storing a single instance of the particular backed-up file, these systems and methods may further reduce (and/or optimize) the storage costs associated with preserving backed-up files placed on legal hold.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary file metadata associated with a backed-up file and an exemplary legal-hold policy.

Figure 1:
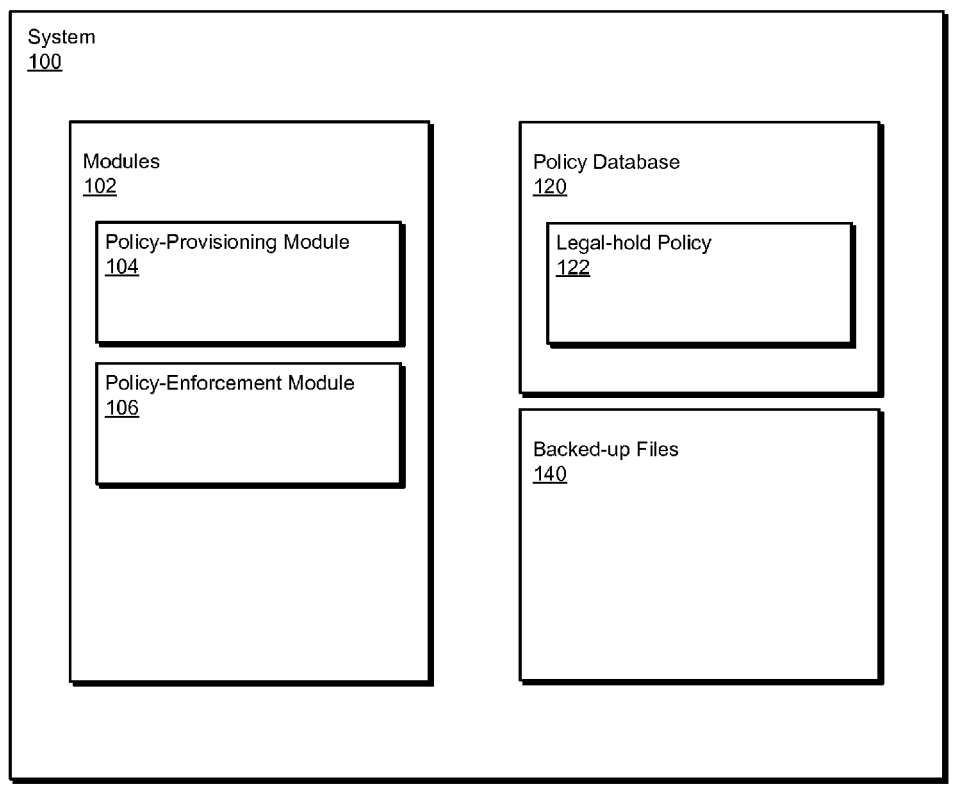
FIG. 1 is a block diagram of an exemplary system for preserving individual backed-up files in accordance with legal-hold policies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for preserving individual backed-up files in accordance with legal-hold policies. The phrase "backed-up file," as used herein, generally refers to any type or form of computer file that has been backed up and/or archived. In addition, the phrase "legal-hold policy," as used herein, generally refers to any collection of rules, instructions, and/or information associated with placing a legal hold on backed-up files. Similarly, the phrase "legal hold," as used herein, generally refers to any type or form of restraint and/or block applied to one or more backed-up files to prevent such backed-up files from being deleted and/or replaced.

Figure 2:
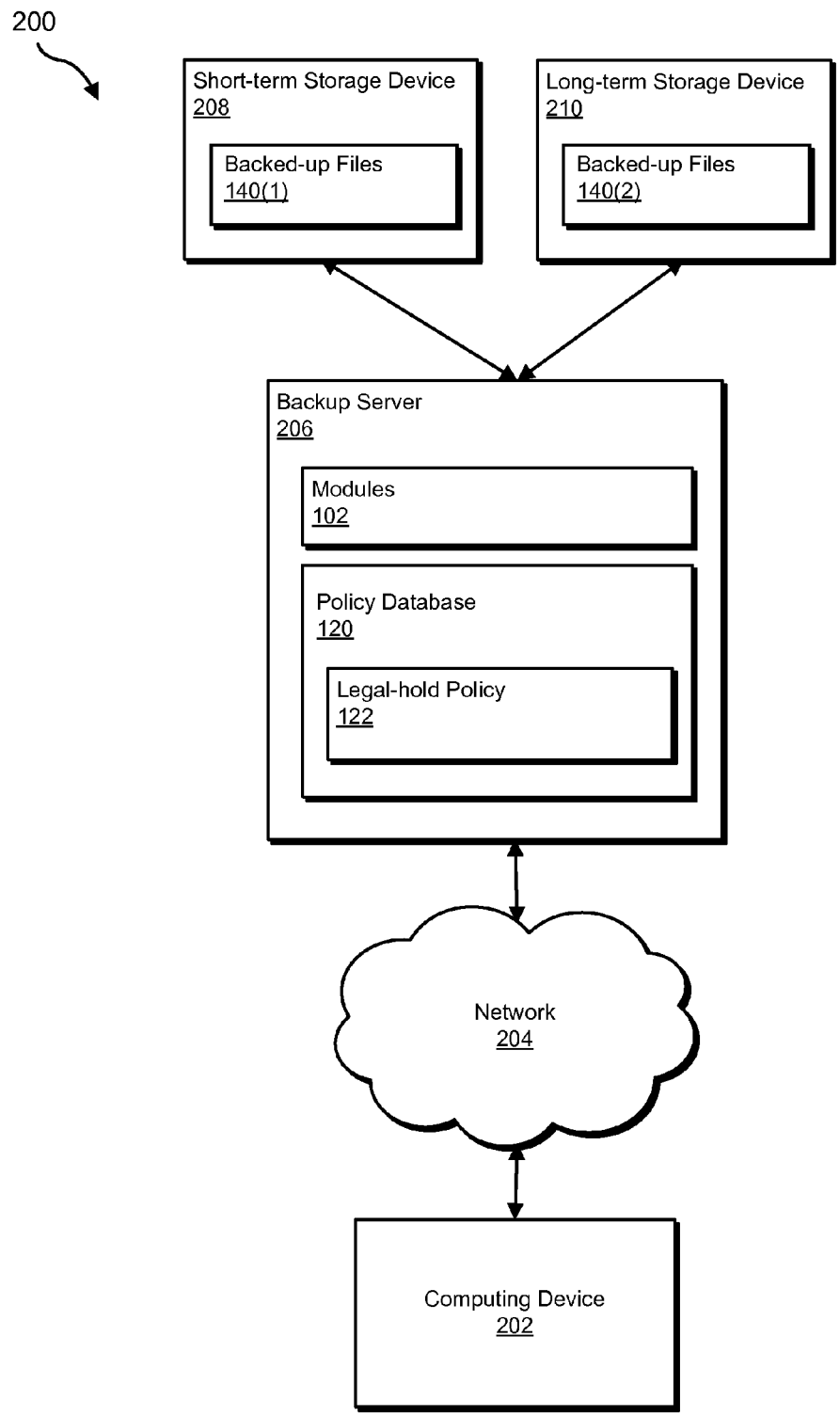
FIG. 2 is a block diagram of an exemplary system for preserving individual backed-up files in accordance with legal-hold policies.

The following will provide, with reference to FIGS. 1-2, detailed descriptions of exemplary systems for preserving individual backed-up files in accordance with legal-hold policies. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preserving individual backed-up files in accordance with legal-hold policies. As illustrated in this figure, exemplary system 100 may include one or more modules 102 for performing one or more tasks. For example, and as will be explained in greater detail below, exemplary system 100 may include a policy-provisioning module 104 programmed to provide at least one legal-hold policy that specifies the manner in which individual backed-up files that potentially relate to legal proceedings are to be preserved.

In addition, and as will be described in greater detail below, exemplary system 100 may include a policy-enforcement module 106 programmed to (1) identify at least one file that has been backed up, (2) identify at least one legal purpose for preventing deletion of the backed-up file, (3) apply, in response to the identification of the legal purpose, the legal-hold policy to the backed-up file by (a) identifying (or creating) file metadata associated with the backed-up file and (b) updating the file metadata associated with the backed-up file to indicate that the legal-hold policy has been applied to the backed-up file, and then (4) preserve the backed-up file in accordance with the legal-hold policy identified in the file metadata associated with the backed-up file. Although illustrated as separate elements, one or more of modules 102 in FIG. 1 may represent portions of a single module or application (such as a backup application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as policy database 120. In one example, policy database 120 may be configured to store one or more policies associated with backing up files and/or preserving backed-up files. For example, policy database 120 may store a legal-hold policy 122 that specifies the manner in which individual backed-up files (e.g., backed-up files 140) that potentially relate to legal proceedings are to be preserved.

Exemplary system 100 may further include one or more computer files, such as backed-up files 140. In some examples, files 140 may have been backed up and/or archived on one or more storage devices. As will be described in greater detail below, in one example legal-hold policy 122 may, when applied to backed-up files 140, preserve files within backed-up files 140 that contain information that potentially relates to at least one legal proceeding.

Policy database 120 may represent portions of a single database or computing device or a plurality of databases or computing devices. For example, policy database 120 may represent a portion of backup server 206 or computing device 202 in FIG. 2, computing system 510 in FIG. 5, and/or portions of exemplary network architecture 600 in FIG. 6. Alternatively, policy database 120 in FIG. 1 may represent one or more physically separate devices capable of being accessed by a computing device, such as backup server 206 or computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup server 206 via a network 204.

In one embodiment, one or more of modules 102 from FIG. 1 may, when executed by at least one processor of backup server 206 or computing device 202, enable backup server 206 or computing device 202 to preserve individual backed-up files in accordance with legal-hold policies. For example, and as will be described in greater detail below, one or more of modules 102 may cause backup server 206 or computing device 202 to (1) provide at least one legal-hold policy that specifies the manner in which individual backed-up files that potentially relate to legal proceedings are to be preserved, (2) identify at least one file that has been backed up, (3) identify at least one legal purpose for preventing deletion of the backed-up file, (4) apply, in response to the identification of the legal purpose, the legal-hold policy to the backed-up file by (a) identifying (or creating) file metadata associated with the backed-up file and (b) updating the file metadata associated with the backed-up file to indicate that the legal-hold policy has been applied to the backed-up file, and then (5) preserve the backed-up file in accordance with the legal-hold policy identified in the file metadata associated with the backed-up file.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing devices.

Backup server 206 generally represents any type or form of computing device capable of managing and/or preserving backed-up files in accordance with legal-hold policies. Examples of backup server 206 include, without limitation, application servers, web servers, and database servers configured to provide various backup and/or database services and/or run certain software applications.

Short-term storage device 208 generally represents any type or form of storage device capable of storing backed-up files in accordance with legal-hold policies. Examples of short-term storage device 208 include, without limitation, disk storage devices, solid-state storage devices (such as solid-state drives or flash drives), tape storage devices, deduplication storage devices (such as segment-level deduplication storage devices or file-level deduplication storage devices), or any other suitable short-term storage devices. In some embodiments, short-term storage device 208 may facilitate faster access to one or more of backed-up files 140 than long-term storage device 210. In at least one embodiment, storage space on short-term storage device 208 may be considered more valuable and/or expensive than storage space on long-term storage device 210.

Long-term storage device 210 generally represents any type or form of storage device capable of storing backed-up files in accordance with legal-hold policies. Examples of long-term storage device 210 include, without limitation, disk storage devices, solid-state storage devices (such as solid-state drives or flash drives), tape storage devices, deduplication storage devices (such as segment-level deduplication storage devices or file-level deduplication storage devices), or any other suitable long-term storage devices. Although short-term storage device 208 and long-term storage device 210 are illustrated as distinct physical devices in FIG. 2, these storage devices may, in some embodiments, represent portions of the same storage device. In further embodiments, the short-term storage device and/or the long-term storage device may represent portions of backup server 206 and/or computing device 202 in FIG. 2.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
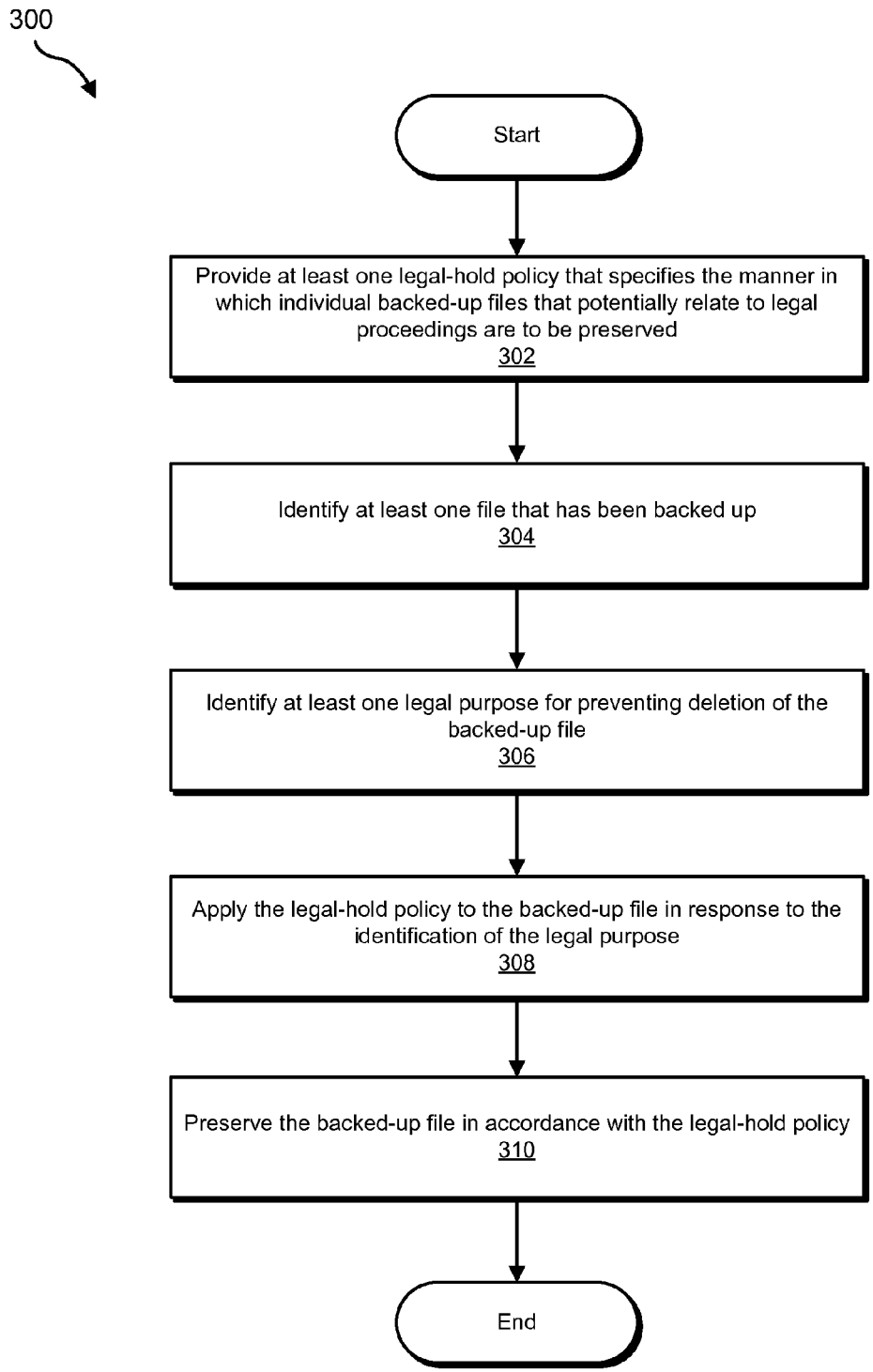
FIG. 3 is a flow diagram of an exemplary method for preserving individual backed-up files in accordance with legal-hold policies.

FIG. 3 is a flow diagram of an exemplary computer-implemented method 300 for preserving individual backed-up files in accordance with legal-hold policies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the various systems described herein may provide at least one legal-hold policy that specifies the manner in which individual backed-up files that potentially relate to legal proceedings are to be preserved. For example, policy-provisioning module 104 may, as part of backup server 206 in FIG. 2, provide at least one legal-hold policy that specifies the manner in which one or more files within backed-up files 140 that potentially relate to at least one legal proceeding (such as a civil lawsuit or criminal case) are to be preserved.

The systems described herein may perform step 302 in a variety of ways. In one example, policy-provisioning module 104 installed on backup server 206 may include the legal-hold policy as a preset or default policy. For example, policy-provisioning module 104 may be part of a backup application that manages and/or preserves files that have been backed up and/or archived. In this example, the legal-hold policy may have been included in an installation package used to install the backup application on backup server 206. As such, policy-provisioning module 104 may make the legal-hold policy available to the backup application immediately upon installation of the backup application.

In another example, policy-provisioning module 104 may receive an update that includes the legal-hold policy. For example, policy-provisioning module 104 may download the legal-hold policy from an online policy repository over the Internet. Additionally or alternatively, policy-provisioning module 104 may obtain the legal-hold policy from a computer-readable medium (such as a CD-ROM or a flash drive). Upon receiving the update that includes the legal-hold policy, policy-provisioning module 104 may make the legal-hold policy available to the backup application that manages and/ or preserves the backed-up files.

As will be described in greater detail below, the legal-hold policy provided in step 302 may include any type or form of rules, instructions, and/or information associated with preserving individual backed-up files that potentially relate to current or anticipated legal proceedings, guidelines, and/or regulations. Legal-hold policy 122 in FIG. 4 is an example of a legal-hold policy that includes information specifying the manner in which individual backed-up files (such as one or more of backed-up files 140) that potentially relate to legal proceedings are to be preserved.

As shown in FIG. 4, legal-hold policy 122 may include information that describes the policy in question (in this example, "PLACE A LEGAL HOLD ON BACKED-UP FILES THAT POTENTIALLY RELATE TO LEGAL PROCEEDINGS UNTIL THE LEGAL PURPOSE CORRESPONDING TO THE LEGAL HOLD HAS BEEN FULFILLED"), potential legal purposes for placing a legal hold on individual backed-up files (in this example, "(1) PRESERVATION OF INFORMATION RELATED TO CURRENT LEGAL PROCEEDING" and "(2) COMPLIANCE WITH LEGAL RULES OR GUIDELINES"), policy types associated with the legal-hold policy (in this example, "(1) SHORT-TERM LEGAL HOLD FOR PRESERVATION OF INFORMATION RELATED TO CURRENT LEGAL PROCEEDING" and "(2) LONG-TERM LEGAL HOLD FOR COMPLIANCE WITH LEGAL RULES OR GUIDELINES"), and types of storage corresponding to the identified policy types (in this example, "SHORT-TERM STORAGE DEVICE" corresponding to the short-term legal hold and "LONG-TERM STORAGE DEVICE" corresponding to the long-term legal hold).

Returning to FIG. 3, at step 304 one or more of the various systems described herein may identify at least one file that has been backed up and/or archived. For example, policy-enforcement module 106 may, as part of backup server 206 in FIG. 2, identify at least one particular file within files 140 that has been backed up and/or archived.

The systems described herein may perform step 304 in a variety of ways. In one example, policy-enforcement module 106 may receive a request that identifies at least one particular file within backed-up files 140 that potentially relates to a legal proceeding. For example, an attorney or court official (such as a judge or legal clerk) may submit a request to place a particular file within backed-up files 140 on legal hold as part of an e-discovery process associated with a civil lawsuit. This request submitted by the attorney or court official may be directed to (1) backup server 206 or (2) a different computing device operated by an administrator in charge of backup server 206 and then redirected to backup server 206. Upon receiving the request on backup server 206, policy-enforcement module 106 may analyze the contents of the request to identify the particular backed-up file to be placed on legal hold.

In another example, policy-enforcement module 106 may identify at least one particular file within backed-up files 140 that potentially relates to a legal proceeding by performing a keyword search with one or more keywords (such as names, pseudonyms, email addresses, physical addresses, dates, geographic locations, URLs, document names, website names or the like). For example, an attorney or court official may submit a request to place all files backed up by backup server 206 that include keywords "John Doe" and/or "Jane Doe" in one form or another. In this example, policy-enforcement module 106 may receive the request submitted by the attorney or court official and then perform a keyword search of backed-up files 140 based on the keywords included in the request. Policy-enforcement module 106 may then identify at least one particular file within backed-up files 140 based on the results of the keyword search.

The particular backed-up file identified by policy-enforcement module 106 may be stored on any suitable storage device. For example, policy-enforcement module 106 may identify the particular backed-up file within backed-up files 140(1) stored on short-term storage device 208. In another example, policy-enforcement module 106 may identify the particular backed-up file within backed-up files 140(2) stored on long-term storage device 210.

In some embodiments, the particular backed-up file identified by policy-enforcement module 106 may have been backed up and/or archived before the legal-hold policy is provided by policy-provisioning module 104 in step 302. In other embodiments, the particular backed-up file identified by policy-enforcement module 106 may have been backed up and/or archived after the legal-hold policy is provided by policy-provisioning module 104 in step 302.

Returning to FIG. 3, at step 306 one or more of the various systems described herein may identify at least one legal purpose for preventing deletion of the particular backed-up file.

For example, policy-enforcement module 106 may, as part of backup server 206, identify at least one legal purpose for preventing deletion of the particular backed-up file that was identified in step 304. As will be described in greater detail below, the identified legal purpose may be any purpose for preventing deletion of at least one backed-up file that potentially relates to a legal proceeding, including (1) preservation of information contained in the backed-up file that potentially relates to a current legal proceeding and/or (2) compliance with one or more legal rules (such as the Federal Rules of Civil Procedure), regulations, or guidelines that require proactively preserving the particular backed-up file in the event that information contained in the particular backed-up file becomes relevant to a future legal proceeding.

The systems described herein may perform step 306 in a variety of ways. In one example, policy-enforcement module 106 may receive a request that identifies the legal purpose for preventing deletion of the particular backed-up file. As described in one of the above examples, an attorney or court official may submit a request to place a particular file within backed-up files 140 on legal hold as part of an e-discovery process associated with a civil lawsuit. In this example, the attorney or court official may include information in the request that identifies the legal purpose for placing the particular backed-up file on legal hold.

This request submitted by the attorney or court official may be directed to backup server 206 or to a different computing device operated by an administrator in charge of backup server 206 and then redirected to backup server 206. Upon receiving the request on backup server 206, policy-enforcement module 106 may analyze the contents of the request to identify the legal purpose for preventing deletion of the particular backed-up file.

In another example, policy-enforcement module 106 may identify the legal purpose within the legal-hold policy. For example, although not illustrated in FIG. 4, the legal-hold policy may include information that implicitly or explicitly discloses the legal purpose for preventing deletion of the particular backed-up file. In one example, the legal-hold policy may specify that all backed-up files that have a particular file attribute are to be placed on legal hold.

In this example, the legal-hold policy may also specify that the legal purpose for placing a legal hold on all backed-up files that have a particular file attribute is to (1) preserve information contained in such backed-up files that potentially relates to a current legal proceeding and/or (2) comply with one or more legal rules (such as the Federal Rules of Civil Procedure), regulations, or guidelines that require proactively preserving such backed-up files in the event that information contained in the backed-up files becomes relevant to a future legal proceeding. Examples of such a file attribute include, without limitation, a particular author of the file, a particular creation or modification date of the file, one or more particular keywords associated with the file, a particular computing device associated with the file, a particular email address associated with the file, a particular geographic location associated with the file, and/or any other file attributes associated with a legal purpose specified in a legal-hold policy.

Returning to FIG. 3, at step 308 one or more of the various systems described herein may apply the legal-hold policy to the backed-up file in response to the identification of the legal purpose. For example, policy-enforcement module 106 may, as part of backup server 206, apply legal-hold policy 122 to the particular backed-up file identified in step 304 in response to the identification of the legal purpose. As will be described in greater detail below, the identification of the legal purpose may be used by policy-enforcement module 106 to determine the manner in which the particular file is to be preserved in accordance with legal-hold policy 122.

The systems described herein may perform step 308 in a variety of ways. In some examples, policy-enforcement module 106 may (1) identify (or create) file metadata associated with the particular file within backed-up files 140 and then (2) update the file metadata associated with the particular backed-up file to indicate that legal-hold policy 122 has been applied to the particular backed-up file. In one example, policy-enforcement module 106 may locate file metadata within a header of the particular backed-up file and then modify this file metadata by inserting information that indicates the particular file has been placed on legal hold. In another example, policy-enforcement module 106 may determine that no file metadata has been associated with the particular backed-up file. In response to this determination, policy-enforcement module 106 may create file metadata to indicate that the particular backed-up file has been placed on legal hold and then associate the file metadata with the particular backed-up file.

Policy-enforcement module 106 may associate the file metadata with the particular backed-up file in a variety of ways. In one example, policy-enforcement module 106 may associate the file metadata with the particular backed-up file by inserting the file metadata within a header of the particular backed-up file. In another example, policy-enforcement module 106 may insert the file metadata within a database that stores file metadata associated with backed-up files 140. In this example, policy-enforcement module 106 may create a hash of the particular backed-up file and then insert the hash within the file metadata stored in the database to facilitate identification of the backed-up file with which the file metadata is associated.

The file metadata associated with the particular backed-up file may include any type or form of information capable of indicating that the legal-hold policy has been applied to the particular backed-up file. File metadata 400 in FIG. 4 is an example of file metadata associated with a particular backed-up file. File metadata 400 may indicate that a legal-hold policy has been applied to the particular backed-up file.

As shown in this figure, file metadata 400 may include information that identifies a name of the particular file within backed-up files 140 with which file metadata 400 is associated (in this example, "EXAMPLE.DOC"), a date that represents the last time that the particular file was backed up (in this example, "03/01/2011"), policies that have been applied to the particular backed-up file (in this example, "(1) SIX-MONTH RETENTION POLICY" and "(2) LEGAL-HOLD POLICY"), and specific policy types that have been applied to the particular backed-up file (in this example, "LONG-TERM LEGAL POLICY"). In addition, although not illustrated in FIG. 4, the file metadata associated with the particular backed-up file may also include information that specifies the legal purpose for preventing deletion of the particular backed-up file and/or information that specifies the type of storage in which the particular backed-up file is to be preserved in accordance with the legal-hold policy.

In some examples, the same legal-hold policy may be applied to multiple files within backed-up files 140 for different legal purposes. For example, policy-enforcement module 106 may determine that the legal purpose for preventing deletion of the particular backed-up file is to preserve information contained in the particular backed-up file that potentially relates to a current legal proceeding. Policy-enforcement module 106 may then apply legal-hold policy 122 to the particular backed-up file in response to identifying this legal purpose.

In the same example, policy-enforcement module 106 may also identify a different legal purpose for preventing deletion of a different file within backed-up files 140. For example, policy-enforcement module 106 may determine that the different legal purpose is to comply with one or more legal rules or guidelines that require proactively preserving such backed-up files in the event that information contained in the backed-up files becomes relevant to a future legal proceeding. Policy-enforcement module 106 may then apply legal-hold policy 122 to the different backed-up file in response to identifying this different legal purpose.

In some examples, policy-enforcement module 106 may, as part of applying legal-hold policy 122 to the particular backed-up file, determine a specific type of legal hold (such as a short-term legal hold or long-term legal hold) to place on the particular backed-up file based on the legal purpose identified in step 306. In one example, if the identified legal purpose is to preserve information that potentially relates to a current legal proceeding, policy-enforcement module 106 may apply a short-term legal hold to the particular backed-up file because legal personnel (such as attorneys, paralegals, and/or legal clerks) involved in the current legal proceeding are expected to access the particular backed-up file in the near future. In this example, policy-enforcement module 106 may store the particular backed-up file in short-term storage device 208 due to the short-term legal hold placed on the particular backed-up file. In at least one embodiment, short-term storage device 208 may facilitate quicker access to the particular backed-up file than long-term storage device 210.

In another example, if the identified legal purpose is to comply with one or more legal rules or guidelines that require proactively preserving the particular backed-up file in the event that information contained in the particular backed-up file becomes relevant to a future legal proceeding, policy-enforcement module 106 may apply a long-term legal hold to the particular backed-up file because no immediate legal need to access the particular backed-up file currently exists. In this example, policy-enforcement module 106 may store the particular backed-up file in long-term storage device 210 due to the long-term legal hold placed on the particular backed-up file. In at least one embodiment, by storing the particular backed-up file on long-term storage device 210, policy-enforcement module 106 may conserve the relatively expensive storage space on short-term storage device 208.

Returning to FIG. 3, at step 310 one or more of the various systems described herein may preserve the backed-up file in accordance with the legal-hold policy identified in the file metadata associated with the backed-up file. For example, policy-enforcement module 106 may, as part of backup server 206, preserve the particular backed-up file identified in step 304 in accordance with legal-hold policy 122. In this example, file metadata 400 may include information that identifies legal-hold policy 122 as being applied to the particular backed-up file.

The systems described herein may perform step 310 in a variety of ways. In some examples, policy-enforcement module 106 may preserve the particular file by placing the particular backed-up file on legal hold for an indefinite (or infinite) period of time. For example, policy-enforcement module 106 may continue to apply legal-hold policy 122 to the particular backed-up file until the legal purpose identified in step 306 has been fulfilled. By continuing to apply legal-hold policy 122 to the particular backed-up file, policy-enforcement module 106 effectively prevents deletion of the particular backed-up file until the identified legal purpose has been fulfilled.

In one example, if the identified legal purpose is to preserve information that potentially relates to a current legal proceeding, policy-enforcement module 106 may continue to apply legal-hold policy 122 to the particular backed-up file until the current legal proceeding has been fully resolved. In another example, if the identified legal purpose is to comply with one or more legal rules or guidelines that require proactively preserving the backed-up file, policy-enforcement module 106 may continue to apply legal-hold policy 122 until such legal rules or guidelines no longer implicate the particular backed-up file. In this example, if such legal rules or guidelines continue to implicate the particular backed-up file for an indefinite period of time, policy-enforcement module 106 may continue to apply legal-hold policy 122 to the particular backed-up file for an indefinite period of time.

In various examples, legal-hold policy 122 may specify the most suitable type of storage (e.g., short-term storage device 208 or long-term storage device 210) for storing the particular backed-up file. Legal-hold policy 122 may indicate that policy-enforcement module 106 is to store the particular backed-up file in a specific type of storage based on the legal purpose identified by policy-enforcement module 106 in step 306.

In one example, if the identified legal purpose is to preserve information that potentially relates to a current legal proceeding, the legal-hold policy may indicate that policy-enforcement module 106 is to store the backed-up file on short-term storage device 208 in order to facilitate relatively quick access to the information. In another example, if the identified legal purpose is to comply with one or more legal rules or guidelines that require proactively preserving the particular backed-up file in the event that information contained in the particular backed-up file becomes relevant to a future legal proceeding, the legal-hold policy may indicate that policy-enforcement module 106 is to store the backed-up file on long-term storage device 210 in order to conserve the relatively expensive storage space on short-term storage device 208.

In some examples, the particular backed-up file may be contained in a backup image. For example, the particular backed-up file may be contained in a backup image stored on short-term storage device 208. In this example, the backup image may also contain various other files within backed-up files 140(1) stored on short-term storage device 208.

In one example, policy-enforcement module 106 may determine that the backup image that contains the particular backed-up file has expired. Policy-enforcement module 106 may then determine whether legal-hold policy 122 indicates that the specific type of legal hold placed on the particular file corresponds to a different type of storage. For example, if a long-term legal hold has been applied to the particular backed-up file, policy-enforcement module 106 may determine that legal-hold policy 122 indicates that the particular backed-up file is to be preserved in long-term storage even though the particular backed-up file is currently stored on short-term storage device 208.

In response to these determinations, policy-enforcement module 106 may transfer the particular backed-up file to the type of storage specified in legal-hold policy 122. For example, policy-enforcement module 106 may then transfer the particular backed-up file from short-term storage device 208 to long-term storage device 210 in accordance with legal-hold policy 122. Upon transferring the particular backed-up file to long-term storage device 210, policy-enforcement module 106 may delete the backup image as well as any remaining copies of the particular backed-up file from short-term storage device 208.

In some examples, policy-enforcement module 106 may have applied at least one additional policy to the particular backed-up file placed on legal hold. For example, as illustrated in FIG. 4, policy-enforcement module 106 may have applied a six-month retention policy to the particular backed-up file placed on legal hold. This additional policy may have provided the backup criteria under which the particular file was originally backed up and/or archived on short-term storage device 208.

Additionally or alternatively, this additional policy may (like legal-hold policy 122) prevent deletion of the particular backed-up file for the duration of time that the additional policy is applied to the particular backed-up file. Moreover, this additional policy may have priority to direct policy-enforcement module 106 regarding the manner in which the particular backed-up file is to be preserved (at least until this additional policy no longer applies to the particular backed-up file).

In one example, policy-enforcement module 106 may determine that (1) the additional policy no longer applies to the particular backed-up file and (2) legal-hold policy 122 is the only policy currently preventing deletion of the backed-up file. For example, policy-enforcement module 106 may determine that the six-month retention policy mentioned in FIG. 4 no longer applies to the particular backed-up file because the file has been retained for longer than six months without being backed up again. In this example, policy-enforcement module 106 may then determine that the only policy that is currently preventing deletion of the particular backed-up file is legal-hold policy 122.

In response to the determination that legal-hold policy 122 is the only policy currently preventing deletion of the backed-up file, policy-enforcement module 106 may transfer the particular backed-up file to the type of storage specified in legal-hold policy 122. For example, policy-enforcement module 106 may then transfer the particular backed-up file from short-term storage device 208 to long-term storage device 210 in accordance with legal-hold policy 122. Upon transferring the particular backed-up file to long-term storage device 210, policy-enforcement module 106 may delete any remaining copies of the particular backed-up file from short-term storage device 208.

In various embodiments, policy-enforcement module 106 may store only a single instance of the particular backed-up file placed on legal hold. For example, policy-enforcement module 106 may ensure that only a single instance of the particular backed-up file is stored between short-term storage device 208 and long-term storage device 210. In this example, if multiple identical instances of the particular backed-up file are stored between short-term storage device 208 and long-term storage device 210, policy-enforcement module 106 may delete any redundant instances until only a single instance of a particular version of the backed-up file is stored in the storage device specified in legal-hold policy 122.

In other embodiments, policy-enforcement module 106 may store multiple instances of the particular backed-up file placed on legal hold. For example, if legal-hold policy 122 applies to different versions of the particular backed-up file, policy-enforcement module 106 may preserve the different versions of the backed-up file in accordance with the legal-hold policy. In this example, policy-enforcement module 106 may store one version of the particular backed-up file on short-term storage device 208 and a different version of the particular backed-up file on long-term storage device 210.

In addition, policy-enforcement module 106 may facilitate lifting the legal hold placed on the particular backed-up file. For example, legal-hold policy 122 may include an option that enables an attorney or court official (such as a judge or legal clerk) to remove the legal hold placed on the particular backed-up file. In this example, upon determining that this option has been set by an attorney or court official, policy-enforcement module 106 may remove the legal hold from the particular backed-up file. In another example, policy-enforcement module 106 may delete legal-hold policy 122 from policy database 120, effectively causing the legal hold placed on the particular backed-up file to be removed.

As explained in greater detail above, by applying a legal-hold policy directly to individual backed-up files (as opposed to an entire backup image containing a variety of files that may not fall within the legal-hold policy), the various systems and methods described herein may avoid placing backed-up files that are unrelated to legal proceedings on legal hold, thereby reducing storage costs associated with preserving such files. In addition, by specifying the most suitable type of storage for storing a particular backed-up file and/or by only storing a single instance of the particular backed-up file, these systems and methods may further reduce (and/or optimize) the storage costs associated with preserving backed-up files placed on legal hold.

Figure 5:
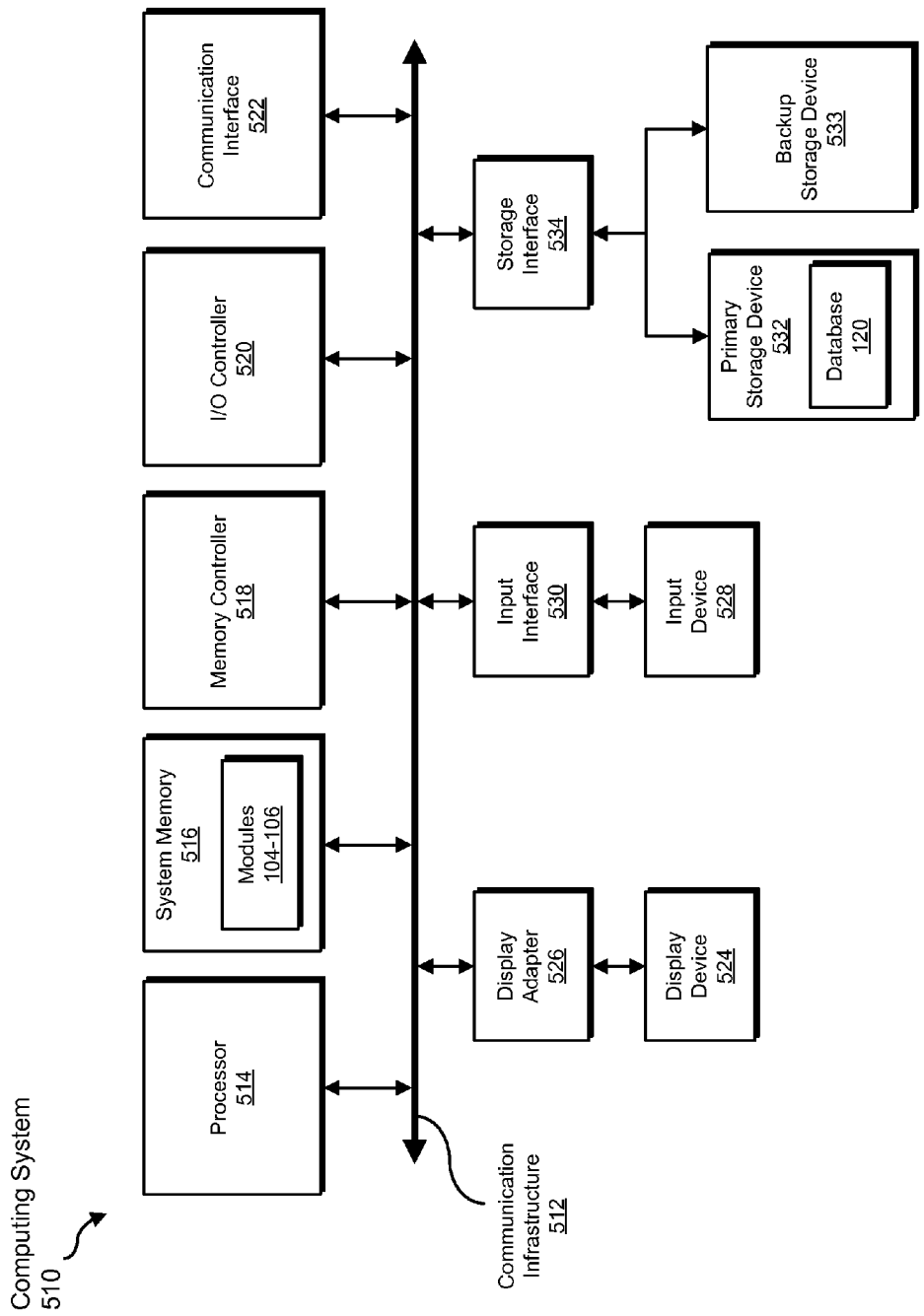
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the providing, identifying, applying, updating, preserving, transferring, preventing, storing, and creating steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, policy database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
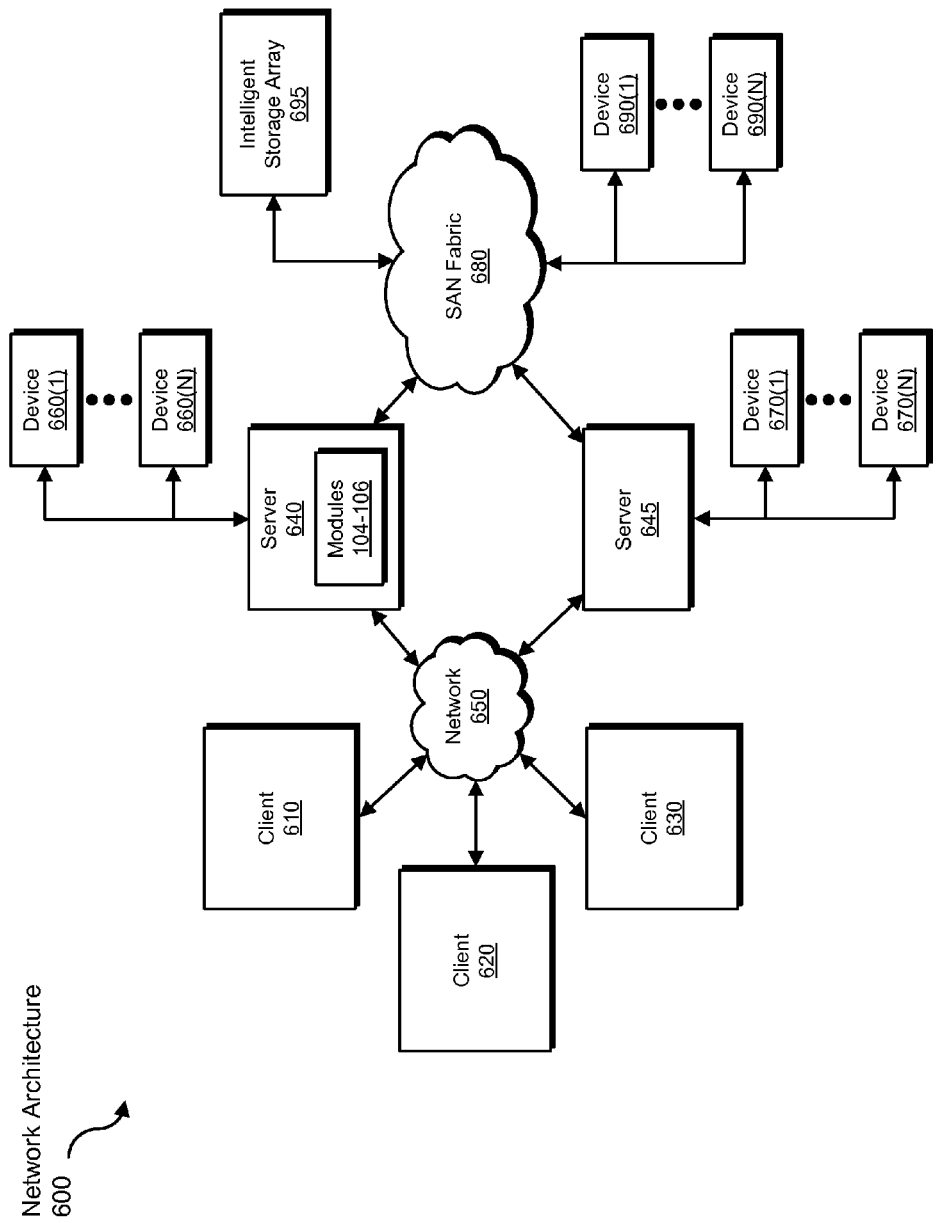
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the providing, identifying, applying, updating, preserving, transferring, preventing, storing, and creating steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preserving individual backed-up files in accordance with legal-hold policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of a physical device (such as short-term storage device 208 or long-term storage device 210) by updating metadata associated with backed-up files that have been placed on legal hold.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preserving individual backed-up files in accordance with legal-hold policies, at least a portion of the method being performed by a computing device comprising at least one processor, the method comprising:
    providing at least one legal-hold policy that specifies:
        the manner in which individual backed-up files that potentially relate to legal proceedings are to be preserved;
        at least one type of storage device in which individual backed-up files that potentially relate to legal proceedings are to be preserved;
    identifying at least one file that has been backed up;
    identifying at least one specific legal purpose for preventing deletion of the backed-up file;
    in response to the identification of the specific legal purpose, applying the legal-hold policy to the backed-up file by:
        identifying file metadata associated with the backed-up file;
        updating the file metadata associated with the backed-up file to indicate that the legal-hold policy has been applied to the backed-up file;
    preserving the backed-up file in accordance with the legal-hold policy identified in the file metadata associated with the backed-up file by:
        determining a specific type of storage device that corresponds to the specific legal purpose for preventing deletion of the backed-up file;
        determining that a backup image that contains the backed-up file has expired;
        in response to determining that the backup image has expired:
            transferring the backed-up file to a storage device of the specific type that corresponds to the specific legal purpose for preventing deletion of the backed-up file;
            storing the backed-up file in the storage device of the specific type due at least in part to the specific legal purpose for preventing deletion of the backed-up file.

2. The method of claim 1, wherein preserving the backed-up file in accordance with the legal-hold policy comprises:
    identifying at least one additional policy that has been applied to the backed-up file to prevent deletion of the backed-up file;
    determining that the additional policy no longer applies to the backed-up file;
    determining that the legal-hold policy is the only policy currently preventing deletion of the backed-up file;
    in response to the determination that the legal-hold policy is the only policy currently preventing deletion of the backed-up file, transferring the backed-up file to a storage device that corresponds to the type of storage specified in the legal-hold policy.

3. The method of claim 1, wherein preserving the backed-up file in accordance with the legal-hold policy comprises preventing deletion of the backed-up file until the specific legal purpose has been fulfilled.

4. The method of claim 1, wherein identifying the specific legal purpose for preventing deletion of the backed-up file comprises at least one of:
    identifying at least one current legal proceeding that involves the backed-up file;
    identifying at least one legal rule or guideline that requires proactively preserving the backed-up file.

5. The method of claim 4, wherein preserving the backed-up file in accordance with the legal-hold policy comprises at least one of:
    storing the backed-up file on a short-term storage device when at least one current legal proceeding involves the backed-up file;
    storing the backed-up file on a long-term storage device when the backed-up file is proactively preserved to comply with at least one legal rule or guideline.

6. The method of claim 1, wherein identifying the file metadata associated with the backed-up file comprises creating the file metadata associated with the backed-up file.

7. The method of claim 1, wherein preserving the backed-up file in accordance with the legal-hold policy comprises storing only a single instance of the backed-up file.

8. A system for preserving individual backed-up files in accordance with legal-hold policies, the system comprising:
    a policy-provisioning module programmed to provide at least one legal-hold policy that specifies:
        the manner in which individual backed-up files that potentially relate to legal proceedings are to be preserved;
        at least one type of storage device in which individual backed-up files that potentially relate to legal proceedings are to be preserved;
    a policy-enforcement module programmed to:
        identify at least one file that has been backed up;
        identify at least one specific legal purpose for preventing deletion of the backed-up file;
        apply, in response to the identification of the specific legal purpose, the legal-hold policy to the backed-up file by:
            identifying file metadata associated with the backed-up file;
            updating the file metadata associated with the backed-up file to indicate that the legal-hold policy has been applied to the backed-up file;

preserve the backed-up file in accordance with the legal-hold policy identified in the file metadata associated with the backed-up file by:
    determining a specific type of storage device that corresponds to the specific legal purpose for preventing deletion of the backed-up file;
    determining that a backup image that contains the backed-up file has expired;
    in response to determining that the backup image has expired:
        transferring the backed-up file to a storage device of the specific type that corresponds to the specific legal purpose for preventing deletion of the backed-up file;
        storing the backed-up file in the storage device of the specific type due at least in part to the specific legal purpose for preventing deletion of the backed-up file;
at least one processor configured to execute the policy-provisioning module and the policy-enforcement module.

9. The system of claim 8, wherein the policy-enforcement module is further programmed to:
identify at least one additional policy that has been applied to the backed-up file to prevent deletion of the backed-up file;
determine that the additional policy no longer applies to the backed-up file;
determine that the legal-hold policy is the only policy currently preventing deletion of the backed-up file;
transfer, in response to the determination that the legal-hold policy is the only policy currently preventing deletion of the backed-up file, the backed-up file to a storage device that corresponds to the type of storage specified in the legal-hold policy.

10. The system of claim 8, wherein the policy-enforcement module is further programmed to prevent deletion of the backed-up file until the specific legal purpose has been fulfilled.

11. The system of claim 8, wherein the policy-enforcement module is further programmed to at least one of:
identify at least one current legal proceeding that involves the backed-up file;
identify at least one legal rule or guideline that requires proactively preserving the backed-up file.

12. The system of claim 11, wherein the policy-enforcement module is further programmed to at least one of:
store the backed-up file on a short-term storage device when at least one current legal proceeding involves the backed-up file;
store the backed-up file on a long-term storage device when the backed-up file is proactively preserved to comply with at least one legal rule or guideline.

13. The system of claim 8, wherein the policy-enforcement module is further programmed to create the file metadata associated with the backed-up file.

14. The system of claim 8, wherein the policy-enforcement module is further programmed to store only a single instance of the backed-up file.

15. A non-transitory computer-readable-storage medium comprising one or more computer-executable instructions that, when executed by at least one processor of a computing device, cause the computing device to:
provide at least one legal-hold policy that specifies:
    the manner in which individual backed-up files that potentially relate to legal proceedings are to be preserved;
    at least one type of storage device in which individual backed-up files that potentially relate to legal proceedings are to be preserved;
identify at least one file that has been backed up;
identify at least one specific legal purpose for preventing deletion of the backed-up file;
apply, in response to the identification of the specific legal purpose, the legal-hold policy to the backed-up file by:
    identifying file metadata associated with the backed-up file;
    updating the file metadata associated with the backed-up file to indicate that the legal-hold policy has been applied to the backed-up file;
preserve the backed-up file in accordance with the legal-hold policy identified in the file metadata associated with the backed-up file by:
    determining a specific type of storage device that corresponds to the specific legal purpose for preventing deletion of the backed-up file;
    determining that a backup image that contains the backed-up file has expired;
    in response to determining that the backup image has expired:
        transferring the backed-up file to a storage device of the specific type that corresponds to the specific legal purpose for preventing deletion of the backed-up file;
        storing the backed-up file in the storage device of the specific type due at least in part to the specific legal purpose for preventing deletion of the backed-up file.

16. The non-transitory computer-readable-storage medium of claim 15, wherein the one or more computer-executable instructions, when executed by the computing device, further cause the computing device to at least one of:
identify at least one current legal proceeding that involves the backed-up file;
identify at least one legal rule or guideline that requires proactively preserving the backed-up file.

17. The method of claim 1, wherein determining that the backup image that contains the backed-up file has expired comprises determining that the expired backup image is currently stored on a specific type of storage device that does not correspond to the specific legal purpose for preventing deletion of the backed-up file;
further comprising, after transferring the backed-up file to a storage device of the specific type that corresponds to the specific legal purpose, deleting the expired backup image that contains the backed-up file from the storage device of the specific type that does not correspond to the specific legal.

18. The method of claim 1, wherein preserving the backed-up file in accordance with the legal-hold policy comprises:
identifying, based at least in part on the legal-hold policy, a long-term storage device that corresponds to the specific legal purpose for preventing deletion of the backed-up file;
determining that a backup image that contains the backed-up file has expired on the short-term storage device;
in response to determining that the backup image has expired on the short-term storage device, transferring the backed-up file to the long-term storage device that corresponds to the specific legal purpose for preventing deletion of the backed-up file.

19. The system of claim 8, wherein the policy-enforcement module is programmed to preserve the backed-up file in accordance with the legal-hold policy by:

determining that the expired backup image is currently stored on a specific type of storage device that does not correspond to the specific legal purpose for preventing deletion of the backed-up file;

after transferring the backed-up file to a storage device of the specific type that corresponds to the specific legal purpose, deleting the expired backup image that contains the backed-up file from the storage device of the specific type that does not correspond to the specific legal.

20. The system of claim 8, wherein the policy-enforcement module is programmed to preserve the backed-up file in accordance with the legal-hold policy by:

identifying, based at least in part on the legal-hold policy, a long-term storage device that corresponds to the specific legal purpose for preventing deletion of the backed-up file;

determining that a backup image that contains the backed-up file has expired on the short-term storage device;

in response to determining that the backup image has expired on the short-term storage device, transferring the backed-up file to the long-term storage device that corresponds to the specific legal purpose for preventing deletion of the backed-up file.

\* \* \* \* \*

UNITED STATES PATENT AND TRADEMARK OFFICE
CERTIFICATE OF CORRECTION

| | | |
|---|---|---|
| PATENT NO. | : 8,972,354 B1 | Page 1 of 1 |
| APPLICATION NO. | : 13/233409 | |
| DATED | : March 3, 2015 | |
| INVENTOR(S) | : Nilesh Telang | |

It is certified that error appears in the above-identified patent and that said Letters Patent is hereby corrected as shown below:

In the Claims

Claim 17, at column 22, line 51, should read:
specific legal purpose.

Claim 19, at column 23, line 10, should read:
legal purpose.

Signed and Sealed this
Eighth Day of September, 2015

Michelle K. Lee
*Director of the United States Patent and Trademark Office*